US008892741B2

(12) United States Patent
Lipari et al.

(10) Patent No.: US 8,892,741 B2
(45) Date of Patent: Nov. 18, 2014

(54) PRESENTATION AND USER SELECTION OF TIMESLOTS

(75) Inventors: Nicola Lipari, Quebec (CA); Rolan Abdukalykov, Quebec (CA)

(73) Assignee: SAP SE, Walldorf (DE)

( * ) Notice: Subject to any disclaimer, the term of this patent is extended or adjusted under 35 U.S.C. 154(b) by 255 days.

(21) Appl. No.: 13/221,773

(22) Filed: Aug. 30, 2011

(65) Prior Publication Data

US 2013/0054805 A1 Feb. 28, 2013

(51) Int. Cl.
*G06F 15/173* (2006.01)
*G06Q 10/10* (2012.01)

(52) U.S. Cl.
CPC ........................................ *G06Q 10/10* (2013.01)
USPC ............. 709/226; 705/5; 705/7.12; 705/7.18; 705/7.19

(58) Field of Classification Search
USPC .................... 709/226; 705/5, 7.12, 7.18–7.19
See application file for complete search history.

(56) References Cited

U.S. PATENT DOCUMENTS

| 7,542,833 | B2 * | 6/2009 | Kelly et al. | 701/31.5 |
|---|---|---|---|---|
| 7,689,441 | B1 * | 3/2010 | Craft | 705/3 |
| 8,209,206 | B2 * | 6/2012 | Ellis et al. | 705/7.12 |
| 2001/0027481 | A1 * | 10/2001 | Whyel | 709/218 |
| 2002/0116232 | A1 * | 8/2002 | Rapp et al. | 705/5 |
| 2008/0114638 | A1 * | 5/2008 | Colliau et al. | 705/9 |
| 2008/0313007 | A1 * | 12/2008 | Callahan et al. | 705/9 |
| 2009/0138283 | A1 * | 5/2009 | Brown | 705/3 |
| 2009/0307044 | A1 * | 12/2009 | Chakra et al. | 705/9 |
| 2010/0191566 | A1 * | 7/2010 | Loring et al. | 705/9 |
| 2012/0130725 | A1 * | 5/2012 | Cooper et al. | 705/1.1 |
| 2012/0215845 | A1 * | 8/2012 | Aad et al. | 709/204 |

FOREIGN PATENT DOCUMENTS

WO WO-2008080525 A1 7/2008

OTHER PUBLICATIONS

Haynes, Thomas, et al., "An Automated Meeting Scheduling Sysem that Utilizes User Preferences", Proceedings of the first international conference on Autonomous agents, (1997), 308-315.
Lw, Xin, et al., "An Efficient Dual Caching Strategy for Web Service-Enabled PDAs", SAC'07, (Mar. 2007), 788-794.

* cited by examiner

*Primary Examiner* — Duyen Doan
(74) *Attorney, Agent, or Firm* — Schwegman Lundberg & Woessner, P..A.

(57) ABSTRACT

In an embodiment, a method of facilitating presentation and user selection of at least one timeslot, such as for an appointment, is presented. In this method, a request for available timeslots within a time period is received from a user device. In response, timeslot data identifying the available timeslots is retrieved from a scheduling system. An identifier key for each of the available timeslots, as well as graphical display data indicating the available time slots, are generated based on the timeslot data. The keys and the graphical display data are transmitted to the user device. A selection of at least one of the identifier keys is received from the user device. In response to receiving the selection, the at least one available timeslot corresponding to the selection is determined and forwarded to the scheduling system to reserve the at least one corresponding available timeslot.

23 Claims, 9 Drawing Sheets

PRESENTATION AND USER SELECTION OF TIMESLOTS

FIELD

The present disclosure relates generally to the presentation of a set of time segments, such as appointment timeslots, and the user selection thereof. In an example embodiment, the disclosure relates to the presentation and selection of available appointment timeslots, wherein each of the available timeslots is associated with an identifier key.

BACKGROUND

In many customer service environments, a customer or user may schedule an appointment with an in-home customer service representative, such as an appliance repair expert, by interacting with a website. More specifically, the website may present a number of predetermined appointment time periods, or "timeslots," from which the user may select a specific timeslot for a maintenance appointment. Typically, a block of timeslots covering some larger time period, such as a day or week, may be presented simultaneously on a single screen to the customer to facilitate the selection of a desired timeslot by the customer. The website may also provide the user the ability to peruse multiple screens, one at a time, in an attempt to discover and select a timeslot that meshes with the current schedule of the customer.

In facilitating the functionality described above, a web server may transmit a significant amount of data to the computer of the customer to provide the appointment scheduling web pages described above. With increased customer use of smart phones and similar portable communication or computing devices, the amount of scheduling data being transmitted, as well as the format in which that data is provided to the customer, may tax or exceed the capabilities of the mobile device. In some instances, the speed at which the scheduling data is transmitted and presented to the user at a mobile communication device may be degraded when compared to that possible with a home computer or similar device.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for presenting multiple timeslots (such as predefined timeslots for appointments for customer service or repair visits, business meetings, doctor's office visits, educational classes, and so on) to a user, and for the reception and reservation of one or more of the timeslots selected by the user.

As is described in greater detail below, the timeslot information received at a user device may be formatted to reduce the amount of communication consumed between the user device and a server device providing the timeslot data, while the original timeslot data continues to be transferred between the server device and a backend system, such as a scheduling system. The server device may also deliver graphical display data in a static format to further simplify communications between the server device and the user device. As a result, the type of user device employable to view and select possible timeslots, such as for appointment scheduling purposes, may range from highly-capable desktop and laptop computer systems to smaller, more portable devices, such as cellular phones, personal digital assistants (PDAs), and the like, without sacrificing performance or detracting from the user experience. Other aspects of the embodiments discussed herein may be ascertained from the following detailed description.

Figure 1:
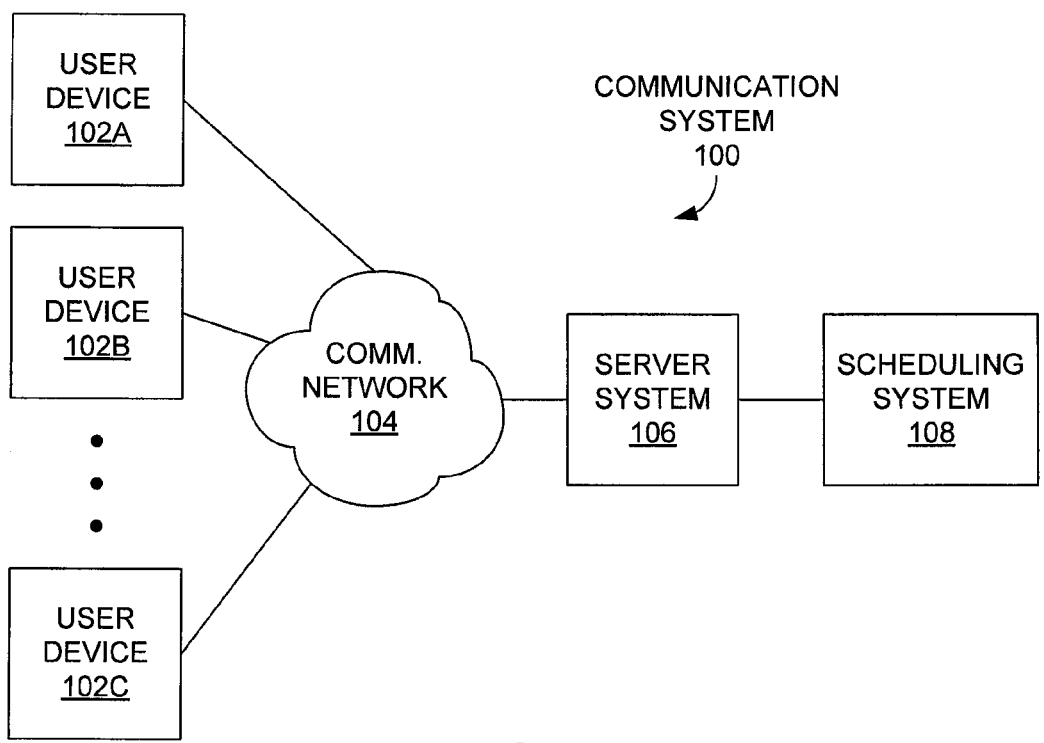
FIG. 1 is a block diagram depicting an example communication system for presenting available timeslots for user selection.

FIG. 1 is a block diagram of an example communication system 100 for the presentation of timeslot information to one or more users, and for the reception and processing of user selections of desired timeslots. In the description that follows, a timeslot may be any contiguous segment of time, time interval, or the like to be reserved or otherwise designated by a user for any purpose. In some examples, a timeslot may be associated with a possible segment of time during which an appointment, such as a meeting, doctor's office visit, or the like, may be scheduled. In other instances, the timeslot may designate a period of time during which an appointment is to begin or end, such as a period of time during which an on-site technician is to arrive to perform a service. Other uses for the user presentation of timeslots and the selection thereof may be employed in other implementations. Also, an "available" timeslot is one in which the timeslot may be reserved, scheduled, or specified for some purpose, such as those listed above. As a result, a timeslot which has already been reserved for one user may not be available for scheduling or reservation for a second user. In other examples in which multiple resources are present for a particular timeslot, the timeslot may be reserved a number of times equal to the number of resources present for that timeslot before the timeslot becomes unavailable.

In FIG. 1, the communication system 100 includes a number of user devices 102A, 102B, 102C (more generally, user devices 102) coupled by way of a communication network 104 to a server system 106, which in turn is communicatively coupled to a scheduling system 108. While FIG. 1 depicts three user devices 102, one or more such user devices 102 may be coupled with the server system 106 via the communication network 104 in other examples. In one example, the server system 106 may be coupled with the scheduling system 108 by way of the communication network 104. Examples of the user devices 102 may include, but are not limited to, desktop and laptop computers, computer tablets, personal digital assistants (PDAs), smart phones, and any other device or system capable of presenting timeslot-related information to a user and receiving user selections of one or more timeslots. One or more of the user devices 102 may provide a user interface, possibly including a visual display and one or more user input components, by which a user may view the available timeslot information and select one or more timeslots of interest.

The communication network 104 may be any communication network, system, or connection capable of transferring data between the user devices 102 and the server system 106. Examples of the communication network 104 may include, but are not limited to, wired and/or wireless wide area networks (WANs) (such as, for example, the Internet) and/or local area networks (LANs) (such as, for example, Ethernet and IEEE 802.11x).

The server system 106 may facilitate the presentation of available timeslots to one or more users via the user devices 102, as well as the reception of the user selection of one or more of the available timeslots from the user devices 102. As is described in greater detail below, the server system 106 may retrieve information regarding the available timeslots from the scheduling system 108, as well as transmit information to the scheduling system 108 to reserve or schedule user-selected timeslots. In some examples, the server system 106 may implement or access a cache or database that stores the information regarding the available timeslots to render the information more readily accessible. In one implementation, the server system 106 may be a web server capable of communicating with each of the user devices 102 via the World Wide Web.

The scheduling system 108 may be any computing system capable of storing, processing, scheduling, and maintaining information regarding available timeslots for selection via the user devices 102. In some examples, the scheduling system 108 may be referred to generally as a backend system or, more specifically, as a customer relationship management (CRM) system operated by, or on behalf of, a business or corporate entity that schedules appointment timeslots for interaction with customers, clients, patients, and/or the like.

Figure 2:
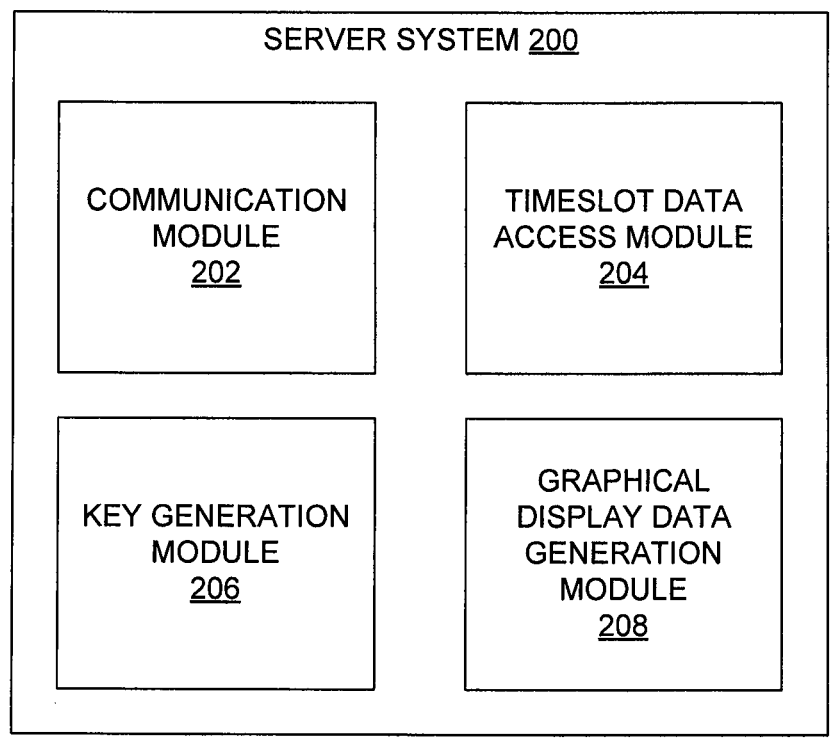
FIG. 2 is a block diagram depicting an example server system employable in the example communication system of FIG. 1.

FIG. 2 is a block diagram of an example server system 200, which may serve as an example of the server system 106 of FIG. 1. As shown in FIG. 2, the server system 200 may include a number of modules for performing various functions or operations relating to the display and selection of one or more timeslots. In one example, the server system 200 may include one or more computer processors (not shown in FIG. 2) capable of executing instructions embodied in the modules to perform the various operations discussed hereinafter. In other examples, the modules may be embodied as hardware, software, firmware, or some combination thereof. As shown in FIG. 2, the server system 200 may include a communication module 202, a timeslot data access module 204, a key generation module 206, and a graphical display data generation module 208.

The communication module 202 may facilitate communications between the server system 200 and one or more user devices, such as the user devices 102 of FIG. 1. In one example, the communication module 202 presents a web interface to the user devices 102 to allow users to view available appointments and select desired appointments by way of one or more web pages. In one specific implementation, the communication module 202 provides static web technology, such as HTML, as opposed to more dynamic web techniques, such as AJAX, to allow a wider range of user devices 102 to be employed to interact with the server system 200. In one example, the communication module 202 may also facilitate the retrieval of timeslot information from the scheduling system 108, as well as data indicating the reservation of one or more available timeslots to the scheduling system 108. In some implementations, the communication module 202 may communicate via the Internet, another WAN, or a LAN, depending on the physical proximity of the server system 200 with the scheduling system 108, and on other factors. In at least some instances, the communication module 202 may employ an interface other than a web interface for communications between the server system 200 and the scheduling system 108.

The timeslot data access module 204 may initiate the retrieval of available timeslot information from the scheduling system 108 based on one or more requests from a user device 102 for available timeslots. The timeslot data access module 204 may also cache or otherwise store the timeslot information received so that the information may be available for future available timeslot requests from the same user device 102 or other user devices 102. In an example, the timeslot information may be stored in data storage, such as volatile memory (for example, dynamic or static random access memory (RAM)) and/or nonvolatile memory (for example, magnetic or optical disk drives, or flash memory) residing within the server system 200. In another instance, the timeslot information may be stored in a database system or external data storage system in communication with the server system 200. The timeslot data access module 204 may also inform the scheduling system 108 of one or more available timeslots to be scheduled or reserved.

To provide timeslot-related information to the user devices 102, the timeslot data access module 204 may employ the key generation module 206 and the graphical display data generation module 208. The key generation module 206 may generate a unique "key," (for example, a short integer value) for each available timeslot of the time period to be presented to one of the user devices 102. In some examples, each key includes less data than the timeslot data from the scheduling system 108 to which the key refers. The graphical display data generation module 208 may generate graphical display data for the available timeslots to be presented or displayed to the requesting user device 102. Together, the keys and the graphical display data allow a user of the requesting user device 102 to view timeslots that are available during some period of time, and to select, and thus reserve, one or more of the available timeslots for the user. The keys and the graphical display data are discussed in greater detail below.

Figure 3A:
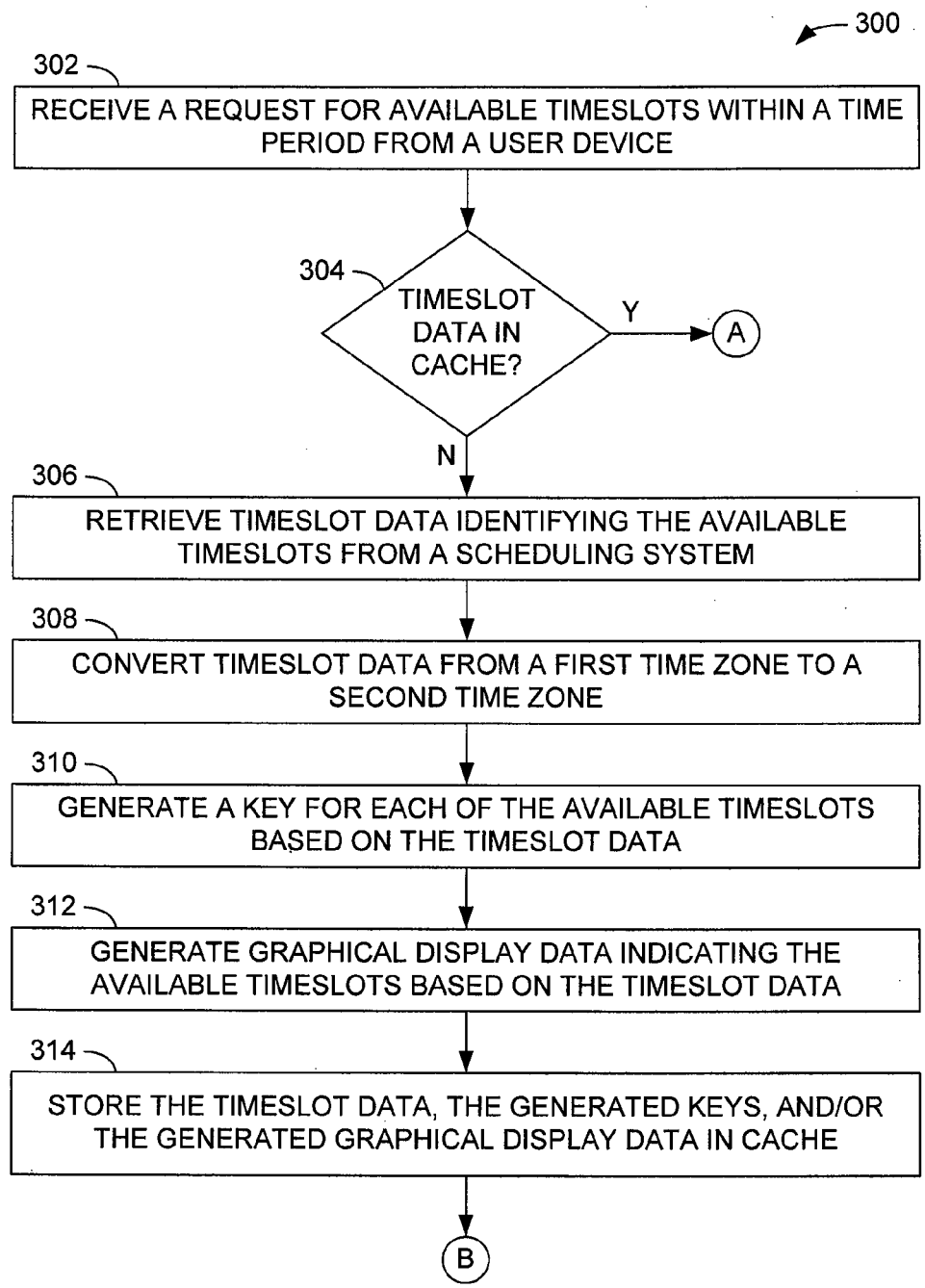
FIGS. 3A and 3B are a flow diagram of an example method of presenting available timeslots for user selection.
Figure 3B:
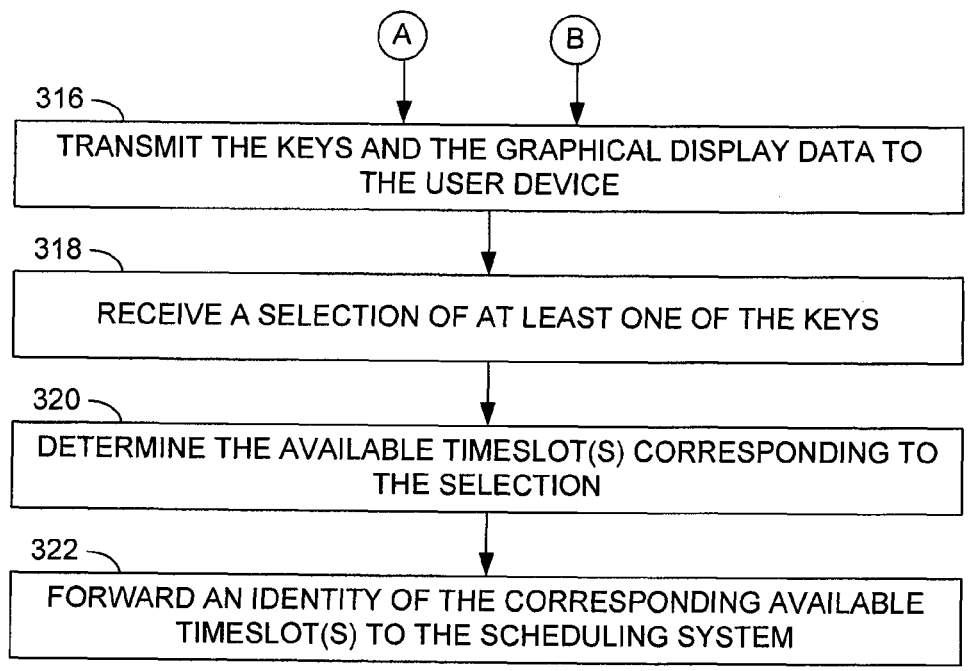

FIGS. 3A and 3B, taken together, are a flowchart of a method 300 of presenting available timeslots, and of receiving and processing a user selection of one or more of the timeslots. In one example, these operations may be performed by the server system 106 of FIG. 1 or the server system 200 of FIG. 2, although other computing systems or combinations thereof may be employed to perform the operations in other embodiments.

In the method 300, a request for available timeslots within a time period is received from a user device 102 (operation 302). In an example, a user of the user device 102 may enter the request in a web page received from the server system 200 as part of a web service facilitating the scheduling of appointments, such as appointments for service calls at the home of the user, appointments at a doctor's office, and so on. In some instances, the user may explicitly specify the time period encompassing the available timeslots (such as, for example, a specific week of interest). In other examples, the server system 106 may determine or presume a default time period (such as, for example, the current week).

In response to the request, the available timeslots for the particular time period may be searched among a number of available timeslots previously retrieved from the scheduling system 108 and stored in a cache or other memory storage system (operation 304). In one example, for each of the available timeslots represented in the cache, the data associated with the available timeslots of a particular time period may include, for example, information specifying each of the timeslots (in terms of, for example, the starting and ending date and/or time of each timeslot), the unique identifier key associated with each of the timeslots, and the graphical display data associated with that time period. If the information for the available timeslots of the desired time period reside in cache or storage, the keys and graphical display data for the available slots of that time period may be transmitted to the user device 102 (as indicated in operation 316 of FIG. 3B).

Otherwise, if the available timeslots of the specified time period are not represented in cache or storage, the timeslot data for that time period may be retrieved from the scheduling system 108 (operation 306). In one example, the server system 200 may transmit a request for that data by providing an identifier for the time period of interest. The request may be provided in the form of a database query or other interrogatory. In response to such a request, the scheduling system 108 may then transfer data specifying the available timeslots for the time period, such as by way of timestamps specifying the starting time (or, in one example, both the starting time and the ending time) of each available timeslot. In other examples, the server system 200 may search a number of data structures, such as data tables, to retrieve the desired timeslot data.

In one example, the retrieved timeslot data may be converted from one time zone to another time zone (operation 308). For example, the timeslot data retrieved from the scheduling system 108 may be specified in a standardized time zone, such as Coordinated Universal Time (UTC) or Greenwich Mean Time (GMT). In another example, the timeslot data may be expressed in the time zone of the scheduling system 108. Such data is likely to be more useful to a user if the timeslot data is converted to the time zone of the user device 102 requesting the timeslot information, to the time zone of the server system 106, or to some closely related time zone. In another example, such time conversion may occur as part of the generation of the graphical display data before that data is transmitted to the requesting user device 102.

A unique identifier key for each of the available timeslots of the requested time period may be generated based on the timeslot data (operation 310). The key, such as a single integer value, may be generated based on at least a portion of the timeslot data of the available timeslot. In one example, the key may be based on the month and day portions of the date (for example, "0625" of June 25) concatenated with the starting or ending time of the timeslot. Use of such a key is unlikely to be confused with other timeslot keys within the same calendar year. In other examples, a date and time associated with a timeslot may be processed in other ways, such as via a hash, to generate the key. In other examples, each of the timeslots may be assigned to a preexisting key based on some set of rules. In yet another implementation, a separate key may be generated or assigned at random to each of the timeslots. Other methods for generating and/or assigning a key to a timeslot may be employed in other embodiments. Generally, the data length of the key is significantly less than the timeslot data associated with the timeslot retrieved from the scheduling system 108.

Graphical display data indicating the available timeslots of the time period are also generated based on the timeslot data (operation 312). An example screen display resulting from the graphical display data is described below in conjunction with FIG. 5. In one example, the graphical display data include information on how the timeslots are represented and arranged on a display screen of the user device. In an embodiment, the graphical display data are formatted in HyperText Markup Language (HTML) or another static format to reduce the amount of intelligence to be employed in the user device 102 to present the timeslot information to the user.

Figure 4:
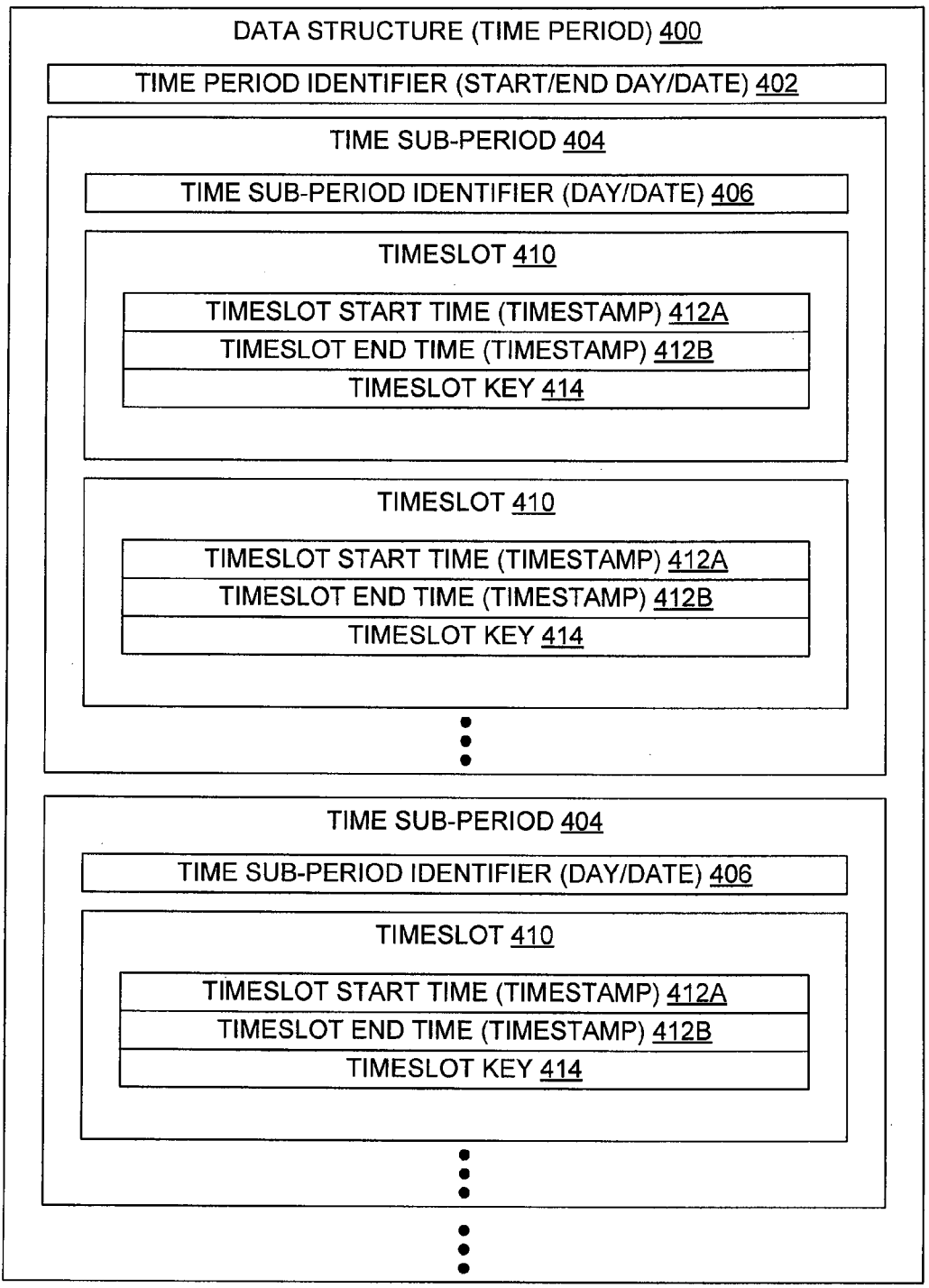
FIG. 4 is a block diagram of an example data structure for storing timeslot data and associated keys.

After the generation of the keys and the graphical display data, any or all of the timeslot data retrieved from the scheduling system 108, the keys, and/or the graphical display data of the requested time periods may be stored or cached for subsequent use (operation 314). In one example, the timeslot data and the keys for the time period are combined into a single data structure to facilitate storage and subsequent retrieval. An example data structure holding each of the keys and associated timeslot data (for example, starting and ending timestamps) is depicted in FIG. 4, described more fully below. In that example, the graphical display data may be stored separately, or may be regenerated from the stored timeslot information each time the stored timeslot information for that time period is requested by a user device 102.

Whether the keys and the graphical display data were previously stored (as detected in operation 304 of FIG. 3A), or currently generated (as described for operations 306 through 314 of FIG. 3A), the resulting keys and graphical display data corresponding to the requested time period are transmitted to the requesting user device 102 (operation 316 of FIG. 3B). In one example, portions of the web page or display on the user device 102 resulting from graphical display data that are associated with the various available timeslots of the time period are associated logically with their corresponding keys. As a result, a user-selected portion of the screen may then cause the corresponding key to be returned to the server system 200, indicating the selected timeslot to be reserved. In some situations, more than one timeslot may be selected, resulting in multiple keys being transmitted from the user device 102 to the server system 200. With the key being employed instead of the original timeslot (timestamp) data in communications between the server system 200 and the user device 102, communication bandwidth is reduced, especially when aggregated across a large number of user devices 102 in communication with the server system 200.

In response to receiving the selection of at least one of the keys at the server system 200 (operation 318), the one or more available timeslots associated with the at least one selected key may then be determined based on the key (operation 320). In examples in which the keys are stored or cached in a manner related to their corresponding timeslot data, the stored keys may be searched for one that matches the key received from the user device 102, and the corresponding timeslot data may then be determined.

The identity of the timeslot, such as the timeslot data itself (for example, the starting and/or ending timestamp of the timeslot) may then be transferred or forwarded to the scheduling system 108 (operation 322) in order to reserve the timeslot for the user employing the requesting user device 102. In some examples, the scheduling system 108 may return a confirmation or similar message to the server system 200, which may then forward that confirmation to the requesting user device 102 to inform the user.

While the operations of FIGS. 3A and 3B are shown in a specific order, other orders of operation, including possibly concurrent execution of at least portions of one or more operations, may be possible in some implementations.

As a result of the method 300, the communication bandwidth consumed to enable the presentation and selection of available timeslots may be reduced due to the use of timeslot keys instead of the complete timestamp data, as a reduced amount of data may be exchanged between the user device 102 and the server system 200. Further, the use of graphical display data that is static in nature allows the use of many mobile devices in the presentation and selection process. In addition, caching the timeslot data from the scheduling system 108 in the server system 200 may also reduce the amount of bandwidth consumed therebetween, as well as possibly decreases the response time for requests for available timeslots of time periods that a user device 102 has previously requested.

FIG. 4 is a block diagram of an example data structure 400 combining the timeslot data from the scheduling system 108 and the corresponding keys for a specific time period. In one example, the time period is a week in length, although any time length (including, but not limited to, a day, a month, or a year) may be utilized for the time period covered by the data structure 400. In one example, the time period related to the data structure 400 is the same time period over which the available timeslots requested by the user device 102 are displayed on a single screen or webpage at the user device 102. As a result, one screen display may be associated with a single data structure 400.

As shown in FIG. 4, included in the data structure 400 may be a time period identifier 402 and a number of time sub-period structures 404. The time period identifier 402 may include one or more timestamps, date stamps, or the like. For example, in implementations in which the time period length is a week, the time period identifier 402 may include a starting day and/or an ending day. An example format for a starting day or ending day may be an integer or a character string of the form {DAY_OF_THE_WEEK}MM/DD, wherein MM is a two-digit month identifier, DD is a two-digit day identifier, and DAY_OF_THE_WEEK is a multiple-character identifier for Monday, Tuesday, and so on (for example, MON, TUE, WED, and the like). Many other types and formats for the time period identifier 402 may be employed in other examples.

Each of the time sub-period structures 404 includes information related to the timeslots of that time sub-period. In examples in which the time period is a week in length, each of the time sub-periods may be a single day. Under that scenario, each of the time sub-period structures 404 may include a time sub-period identifier 406 indicating the day and/or date identifying the time sub-period. In such an implementation, the time sub-period identifier 406 may be an integer or character string of the form {DAY_OF_THE_WEEK}MM/DD, as described above. Other formats for the time sub-period identifier 406 are also possible. In other examples, the arrangement of the time sub-period structures 404 within the time period data structure 400 may allow the time sub-period structures 404 to be identified without the need for the time sub-period identifiers 406. For instance, for a time period of a week in length, and a corresponding data structure 400 that includes seven time sub-period structures 404 arranged in a specific order, each of the time sub-period structures 404 may be correlated with a particular day of the week, the extent of which may be identified in the time period identifier 402 discussed above.

Each of the time sub-period structures 404 may include one or more timeslot structures 410, wherein each of the timeslot structures 410 represents a specific timeslot that is available during the time sub-period represented by the encompassing time sub-period structure 404. As shown in FIG. 4, each timeslot structure 410 may include a timeslot start time 412A, a timeslot end time 412B, and a timeslot key 414. As discussed above, the server system 200 generates each timeslot key 414 based on the timeslot data retrieved from the scheduling system 108. In some implementations, the timeslot start time 412A and the timeslot end time 412B are at least a portion of the retrieved timeslot data from the scheduling system 108. In a further example, each of the timeslot start time 412A and the timeslot end time 412B may be written in the format YYYYMMDDhhmmss, in which YYYY is a four-digit year, MM is a two-digit month, DD is a two-digit day, hh is two-digit hour, mm is a two-digit minute, and ss is a two-digit second.

If the server system 200 has not performed any time zone conversion, the time zone associated with the timeslot start time 412A and the timeslot end time 412B may be, for example, UTC, GMT, or a time zone associated with the scheduling system 108. If, instead, the server system 200 has performed time zone conversion on the retrieved timeslot data, the time zone associated with the timeslot start time 412A and the timeslot end time 412B may be, for example, a time zone associated with the server system 200, or a time zone associated with one or more of the user devices 102, such as the user device 102 that requested the available timeslots for a specific time period.

By associating the timeslot start time 412A and the timeslot end time 412B with the timeslot key 414 by storing them together within the same timeslot structure 410, the server system 200, upon receiving a selected key from a user device 102, may then determine the associated timeslot start time 412A, timeslot end time 412B, or both, and reserve the corresponding timeslot via the scheduling system 108 using that information. In other examples, only the timeslot start time 412A, the timeslot end time 412B, or some other timestamp or identifier may be stored in the timeslot structure 410.

Given the data structure 400 of FIG. 4 for each time period, the server system 200 may store or cache a single data structure 400 for each new time period of timeslots retrieved from the scheduling system 108 for subsequent transfer to any of the user devices 102. In some examples, the server system 200 may update the data structure 400 of a specific time period to reflect any timeslots that a user device 102 may have reserved. In one implementation, in response to a timeslot in the data structure 400 being reserved, the server system 200 may delete from the data structure 400 the timeslot structure 410 corresponding to the reserved timeslot. As a result, the server system 200 need not retrieve available timeslot data and rebuild the associated data structures 400 for time periods during which one or more timeslots have been reserved.

Figure 5:
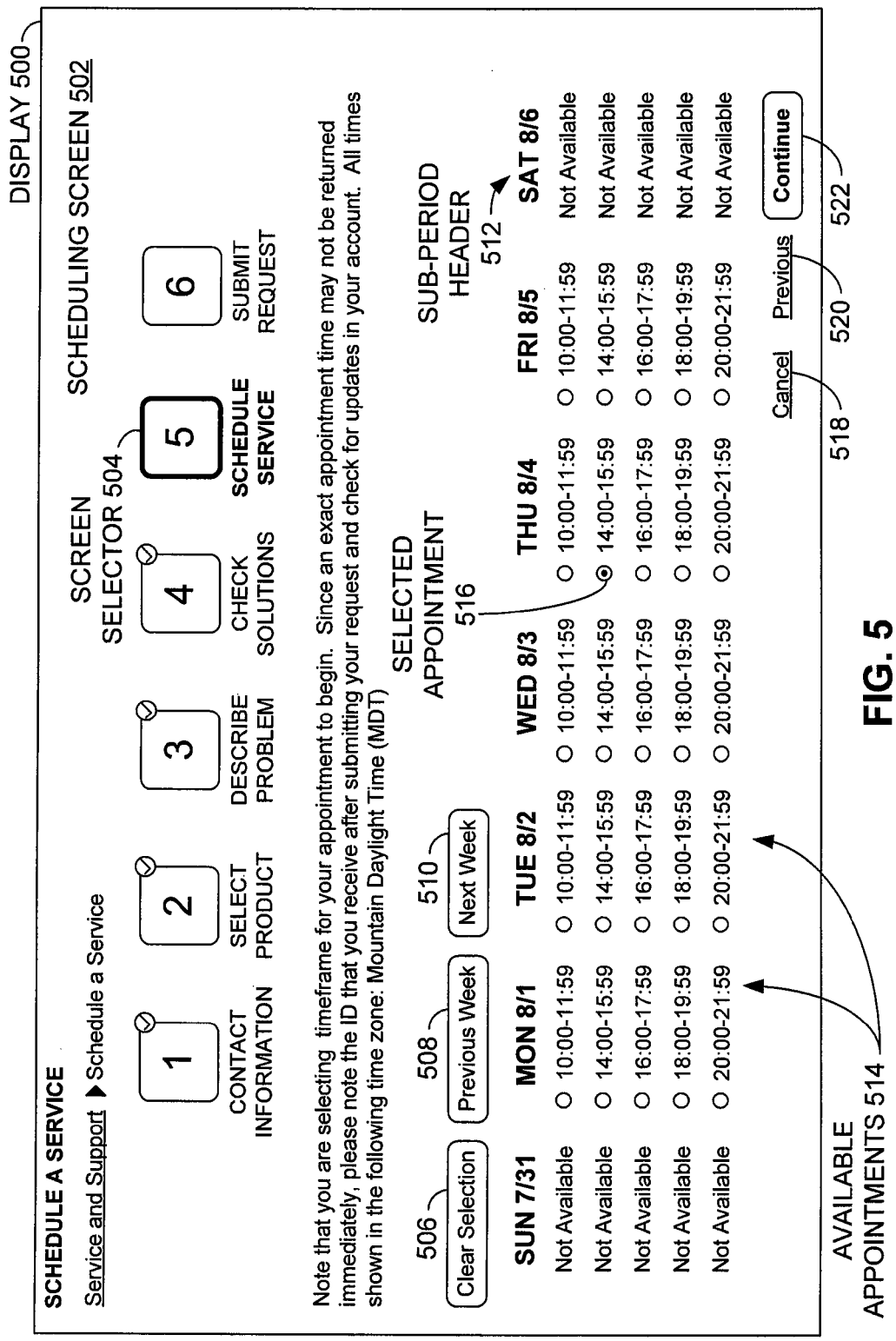
FIG. 5 is a graphical representation of an example display presenting multiple timeslots for possible appointments to a user for selection.

FIG. 5 is a graphical representation of an example display 500 presented on a user device 102 for displaying available timeslots during a specific time period, and for facilitating the selection of a timeslot for reservation. In this example, the display 500 is a web page, such as an HTML web page, that is presented as part of a service and support website for a specific company. In the specific example of FIG. 5, the display 500 presents a scheduling screen 502 for reservation of an appointment during one of a plurality of available timeslots offered by the company. The scheduling screen 502 is the fifth of a series of six screens through which the user may navigate to set up a service appointment for a particular product. The screens include a screen for providing customer contact information (Screen 1), a screen to select the product upon which the service is to be performed (Screen 2), a screen to describe the problem associated with the product (Screen 3), a screen to check for possible solutions to the problem in lieu of a service visit (Screen 4), the scheduling screen 502 to schedule a service appointment (Screen 5), and a screen submit the service appointment request (Screen 6). The user may navigate to any of the six screens by way of the screen selectors 504 provided near the top of the scheduling screen 502, or by using a Previous link 520 or a Continue button 522 to progress backward or forward, respectively, through each of the screens. The user may also cancel out of the entire service and support process by activating a Cancel link 518. As shown in FIG. 5, the user has provided the information requested in each of the first four screens, as indicated by way of the checkmarks displayed thereon, and is now viewing the fifth screen to schedule an appointment.

Presented on the scheduling screen 502 is a grid of timeslots covering a time period of one week, with each day of that week forming a separate column labeled with a sub-period header 512, and with each label indicating the day and date of the sub-period (for example, SUN 7/31, MON 8/1, and so on). Listed under each sub-period header 512 is the available timeslots for that day in chronological order. In one example, a single data structure 400 (FIG. 4) provides the timeslot data, with the data structure 400 covering the week from July 31 through August 6, inclusive, and with each day of that week representing a time sub-period of the data structure 400. In one example, the data structure 400 may or may not include time sub-period structures 404 (FIG. 4) for Sunday, July 31, and Saturday, August 6, as no appointments are available for those two days. Each of the other five days includes five available timeslots, each two hours in length.

In one implementation, the server system 200 generates the graphical display data from which the scheduling screen 502 is produced from the timeslot data previously retrieved from the scheduling system 108. In one example, the unavailable timeslots (marked "Not Available" in FIG. 5) may be determined on the basis of the available timeslots represented in the timeslot data from the scheduling system 108. More specifically, by requesting available timeslots for the time period of July 31 through August 6, and thereafter receiving timeslot data for five timeslots for each of the dates of August 1 through August 5, and none for July 31 and August 6, the server system 200 may represent corresponding timeslots on July 31 and August 6 as unavailable in the graphical display data. In addition, the sub-period headers 512 may be created directly from the time sub-period identifiers 406 (FIG. 4) of the data structure 400, while the start and end timestamps of the available timeslots in the scheduling screen 502 are generated from the timeslot start time 412A and the timeslot end time 412B of each timeslot structure 410 of the overall data structure 400.

In FIG. 5, the user has selected a timeslot 516 on Thursday, August 4 by clicking a radio button corresponding with that timeslot 516. To register the selection with the server system 200 by sending the key associated with the selected timeslot 516, the user may activate the Continue button 522 to proceed to the Submit Request screen (Screen 6). On the Submit Request screen, the server system 200 may confirm that the desired timeslot was reserved. To cancel out of the entire service and support system, the user may instead activate the Cancel link 518. To clear any current selections made on the scheduling screen 502, the user may activate the Clear Selection button 506.

Further, if the user decides the current time period (week) does not provide any acceptable choices for an appointment, the user may instead navigate to the previous week via the Previous Week button 508, or to the next week via the Next Week button 510. In response, the server system 200 may search its cache or storage for the requested time period, as discussed with respect to operation 304 of FIG. 3A. If the time period is represented by a corresponding data structure 400 (FIG. 4), the server system 200 may then transmit the timeslot keys and associated graphical display data to the user device 102 (operation 316 of FIG. 4B). Otherwise, the timeslot data may be retrieved from the scheduling system 108 (operation 306 of FIG. 3A), the timeslot data may be converted to a new time zone (operation 308), and the appropriate keys and graphical display data may be generated (operations 310 and 312), stored (operation 314), and then transmitted to the user device 102 (operation 316).

Figure 6:
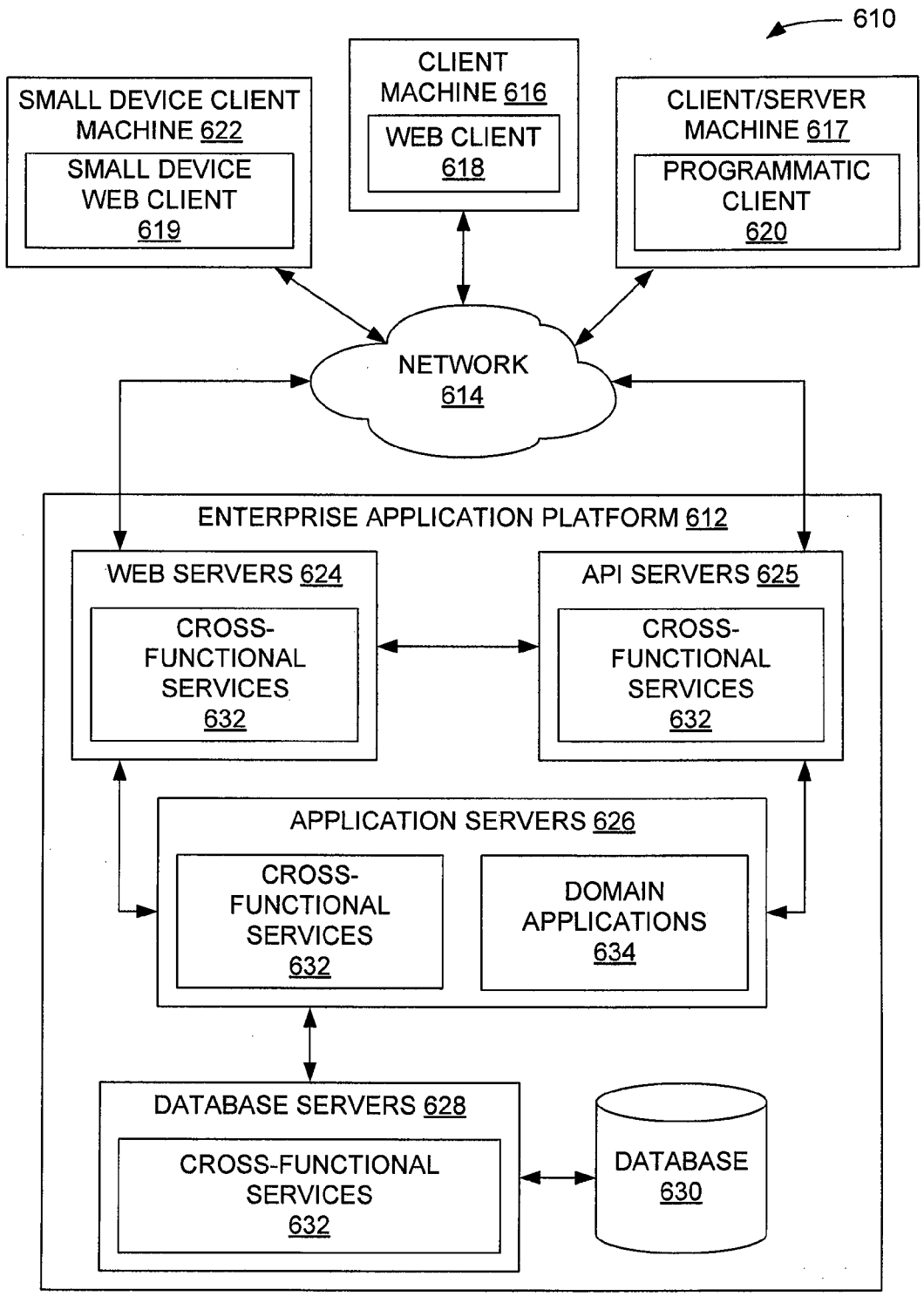
FIG. 6 is a block diagram of an example system having a client-server architecture for an enterprise application platform capable of employing the systems and methods described herein.

FIG. 6 is a network diagram depicting an example system 610, according to one exemplary embodiment, having a client-server architecture configured to perform the various methods described herein. A platform (e.g., machines and software), in the exemplary form of an enterprise application platform 612, provides server-side functionality via a network 614 (e.g., the Internet) to one or more clients. FIG. 6 illustrates, for example, a client machine 616 with a web client 618 (e.g., a browser, such as the INTERNET EXPLORER browser developed by Microsoft Corporation of Redmond, Wash. State), a small device client machine 622 with a small device web client 619 (e.g., a browser without a script engine) and a client/server machine 617 with a programmatic client 620.

Turning specifically to the enterprise application platform 612, web servers 624, and Application Program Interface (API) servers 625 are coupled to, and provide web and programmatic interfaces to, application servers 626. The application servers 626 are, in turn, shown to be coupled to one or more database servers 628 that may facilitate access to one or more databases 630. The web servers 624, Application Program Interface (API) servers 625, application servers 626, and database servers 628 may host cross-functional services 632. The application servers 626 may further host domain applications 634.

The cross-functional services 632 may provide user services and processes that utilize the enterprise application platform 612. For example, the cross-functional services 632 may provide portal services (e.g., web services), database services, and connectivity to the domain applications 634 for users that operate the client machine 616, the client/server machine 617, and the small device client machine 622. In addition, the cross-functional services 632 may provide an environment for delivering enhancements to existing applications and for integrating third party and legacy applications with existing cross-functional services 632 and domain applications 634. Further, while the system 610 shown in FIG. 6 employs a client-server architecture, the present disclosure is of course not limited to such an architecture, and could equally well find application in a distributed, or peer-to-peer, architecture system.

Figure 7:
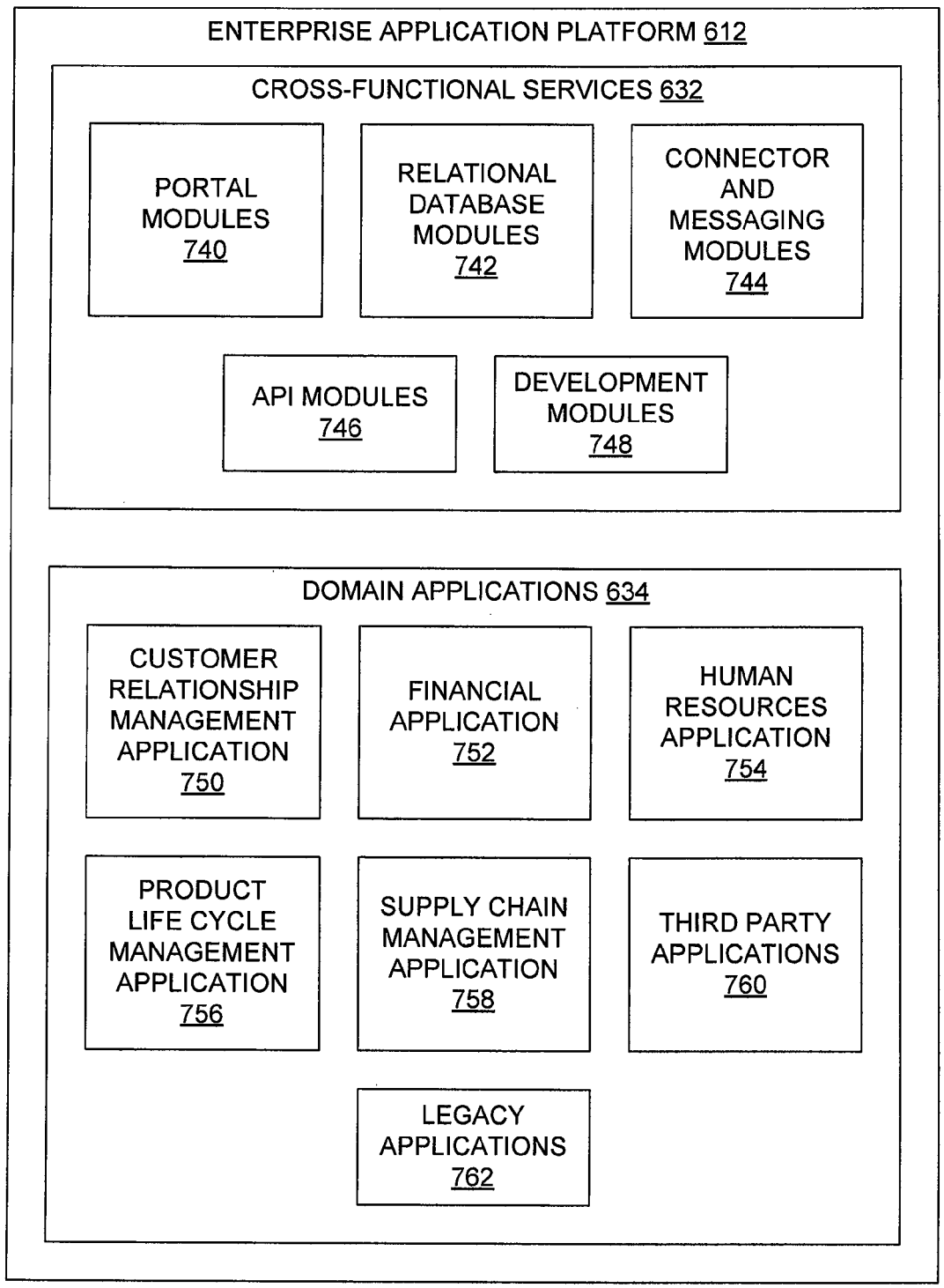
FIG. 7 is a block diagram of example applications and modules employable in the enterprise application platform of FIG. 6.

FIG. 7 is a block diagram illustrating example enterprise applications and services, such as those described herein, as embodied in the enterprise application platform 612, according to an exemplary embodiment. The enterprise application platform 612 includes cross-functional services 632 and domain applications 634. The cross-functional services 632 include portal modules 740, relational database modules 742, connector and messaging modules 744, Application Program Interface (API) modules 746, and development modules 748.

The portal modules 740 may enable a single point of access to other cross-functional services 632 and domain applications 634 for the client machine 616, the small device client machine 622, and the client/server machine 617 of FIG. 6. The portal modules 740 may be utilized to process, author, and maintain web pages that present content (e.g., user interface elements and navigational controls) to the user. In addition, the portal modules 740 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 740 may include, in one implementation, a generation module, a communication module, a receiving module, and a regenerating module. In addition, the portal modules 740 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft .NET.

The relational database modules 742 may provide support services for access to the database 630 (FIG. 6) that includes a user interface library. The relational database modules 742 may provide support for object relational mapping, database independence, and distributed computing. The relational database modules 742 may be utilized to add, delete, update, and manage database elements. In addition, the relational database modules 742 may comply with database standards and/or utilize a variety of database technologies including, but not limited to, SQL, SQLDBC, Oracle, MySQL, Unicode, and JDBC.

The connector and messaging modules 744 may enable communication across different types of messaging systems that are utilized by the cross-functional services 632 and the domain applications 634 by providing a common messaging application processing interface. The connector and messaging modules 744 may enable asynchronous communication on the enterprise application platform 612.

The Application Program Interface (API) modules 746 may enable the development of service-based applications by exposing an interface to existing and new applications as services. Repositories may be included in the platform as a central place to find available services when building applications.

The development modules 748 may provide a development environment for the addition, integration, updating, and extension of software components on the enterprise application platform 612 without impacting existing cross-functional services 632 and domain applications 634.

Turning to the domain applications 634, the customer relationship management applications 750 may enable access to and facilitate collecting and storing of relevant personalized information from multiple data sources and business processes. Enterprise personnel that are tasked with developing a buyer into a long-term customer may utilize the customer relationship management applications 750 to provide assistance to the buyer throughout a customer engagement cycle.

Enterprise personnel may utilize the financial applications 752 and business processes to track and control financial transactions within the enterprise application platform 612. The financial applications 752 may facilitate the execution of operational, analytical and collaborative tasks that are associated with financial management. Specifically, the financial applications 752 may enable the performance of tasks related to financial accountability, planning, forecasting, and managing the cost of finance.

The human resources applications 754 may be utilized by enterprise personnel and business processes to manage, deploy, and track enterprise personnel. Specifically, the human resources applications 754 may enable the analysis of human resource issues and facilitate human resource decisions based on real-time information.

The product life cycle management applications 756 may enable the management of a product throughout the life cycle of the product. For example, the product life cycle management applications 756 may enable collaborative engineering, custom product development, project management, asset management, and quality management among business partners.

The supply chain management applications 758 may enable monitoring of performances that are observed in supply chains. The supply chain management applications 758 may facilitate adherence to production plans and on-time delivery of products and services.

The third-party applications 760, as well as legacy applications 762, may be integrated with domain applications 634 and utilize cross-functional services 632 on the enterprise application platform 612.

Figure 8:
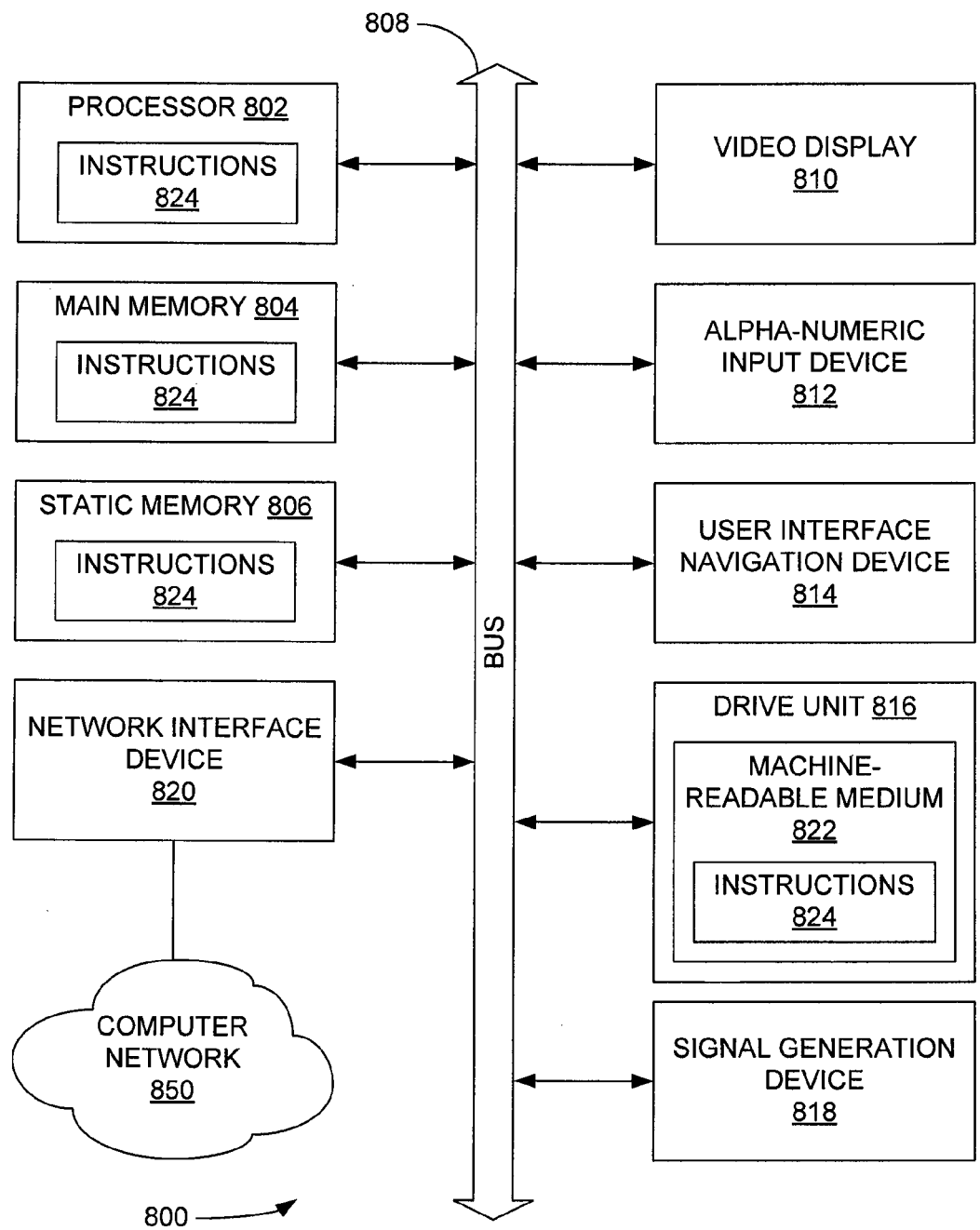
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (for example, a central processing unit (CPU), a graphics processing unit (GPU), or both), a main memory 804 (for example, random access memory), and static memory 806 (for example, static random-access memory), which communicate with each other via bus 808. The processing system 800 may further include video display unit 810 (for example, a plasma display, a liquid crystal display (LCD), or a cathode ray tube (CRT)). The processing system 800 also includes an alphanumeric input device 812 (for example, a keyboard), a user interface (UI) navigation device 814 (for example, a mouse), a disk drive unit 816, a signal generation device 818 (for example, a speaker), and a network interface device 820.

The disk drive unit 816 (a type of non-volatile memory storage) includes a machine-readable medium 822 on which is stored one or more sets of data structures and instructions 824 (for example, software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 800) or one or more hardware modules of a computer system (for example, a processor 802 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (for example, by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (for example, within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, techniques for providing managerial access to a managed system may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
receiving, at a server system, from a user device via a communication network, a request for available timeslots within a first time period;
retrieving, at the server system, from a scheduling system in response to receiving the request, a set of timeslot data corresponding to a set of available timeslots within the first time period;
generating, by the server system, a set of identifier keys for the set of available timeslots, each identifier key corresponding to one available timeslot, each identifier key comprising less data than the corresponding timeslot data;

generating, by the server system, graphical display data indicating the available timeslots of the first time period based on the timeslot data;

transmitting, via the communication network to the user device, the identifier keys and the graphical display data;

receiving, from the user device via the communication network, a selection of at least one of the identifier keys;

determining at least one of the available timeslots corresponding to the selection of the at least one of the identifier keys; and forwarding an identity of the at least one corresponding available timeslot to the scheduling system to reserve the at least one corresponding available timeslot.

2. The method of claim 1, the timeslot data comprising a starting timestamp and an ending timestamp for each of the available timeslots of the first time period.

3. The method of claim 1, wherein each of the identifier keys is a unique integer within the set of identifier keys.

4. The method of claim 1, further comprising:

generating a data structure comprising the identifier keys for the available timeslots within the first time period and the timeslot data identifying the available timeslots within the first time period, each of the identifier keys being associated in the data structure to the timeslot data identifying the available timeslot corresponding to the identifier key.

5. The method of claim 4, further comprising:

updating the data structure and the graphical display data based on the selection of the at least one of the identifier keys;

storing the updated data structure and the updated graphical display data;

receiving, from the user device via the communication network, a second request for data identifying available timeslots within a second time period; and transmitting, via the communication network to the user device, the updated graphical display data and the identifier keys from the updated data structure based on the second time period comprising the first time period.

6. The method of claim 5, the updating of the data structure comprising removing from the data structure the at least one selected identifier key and a portion of the timeslot data corresponding to the at least one selected identifier key.

7. The method of claim 1, further comprising determining unavailable timeslots based on the timeslot data identifying the available timeslots within the first time period.

8. The method of claim 1, the first time period comprising a plurality of time sub-periods, each of the plurality of time sub-periods comprising a subset of the available timeslots, the data structure comprising an identifier for each of the plurality of time sub-periods.

9. The method of claim 8, the first time period comprising a week, and each of the plurality of time sub-periods comprising a day.

10. The method of claim 1, the timeslot data being expressed in a first time zone, the method further comprising converting the timeslot data from the first time zone to a second time zone prior to generating the graphical display data.

11. The method of claim 1, each of the available timeslots representing an available timeslot for scheduling an appointment.

12. The method of claim 1, the communication network comprising a cellular phone communication network.

13. A non-transitory computer-readable storage medium comprising instructions that, when executed by at least one processor of a machine, cause the machine to perform operations comprising:

receiving, from a user device via a communication network, a request for available timeslots within a time period;

retrieving, from a scheduling system, in response to receiving the request, a set of timeslot data corresponding to a set of available timeslots within the time period;

generating a set of identifier keys for the set of available timeslots within the time period, each identifier key corresponding to one available timeslot, each identifier key comprising less data than the corresponding timeslot data;

generating graphical display data indicating the available timeslots of the time period based on the timeslot data;

transmitting, via the communication network to the user device, the identifier keys and the graphical display data;

receiving, from the user device via the communication network, a selection of at least one of the identifier keys;

determining, in response to receiving the selection of the at least one of the identifier keys, at least one of the available timeslots corresponding to the selection of the at least one of the identifier keys; and forwarding an identity of the at least one corresponding available timeslot to the scheduling system to reserve the at least one corresponding available timeslot.

14. A system comprising at least one processor and a plurality of modules comprising instructions executable by the at least one processor, the modules comprising:

a communication module to communicate with a user device to receive a request for available timeslots within a first time period;

a timeslot data access module to retrieve from a scheduling system timeslot data corresponding to available timeslots within the first time period in response to receiving the request;

a key generation module to generate a set of identifier keys for the available timeslots within the first time period, each identifier key corresponding to one available timeslot, each identifier key comprising less data than the corresponding timeslot data; and a graphical display data generation module to generate graphical display data indicating the available timeslots of the first time period based on the timeslot data;

the communication module to transmit to the user device the identifier keys and the graphical display data, and to receive from the user device a selection of at least one of the identifier keys; and the timeslot data access module to determine the at least one of the available timeslots corresponding to the selection of the at least one of the identifier keys in response to receiving the selection, and to forward an identity of the at least one corresponding available timeslot to the scheduling system to reserve the at least one corresponding available timeslot.

15. The system of claim 14 wherein:

the timeslot data access module is to update the identifier keys and the graphical display data based on the selection of the at least one of the identifier keys, and to store the updated identifier keys and the updated graphical display data; and the communication module is to receive from the user device a second request for data identifying available timeslots within a second time period, and to transmit to the user device the updated graphical display data and the updated identifier keys based on the second time period comprising the first time period.

16. The system of claim 15, wherein the timeslot data access module is to update the identifier keys by deleting the at least one selected identifier key and a portion of the timeslot data corresponding to the at least one selected identifier key.

17. The system of claim 14, wherein the graphical display data comprises data identifying both the available timeslots of the first time period and unavailable timeslots of the first time period.

18. The system of claim 17, wherein the graphical display data generation module is to determine the unavailable timeslots based on the timeslot data identifying the available timeslots within the first time period.

19. The system of claim 14, wherein the first time period comprises a plurality of time sub-periods, each of the plurality of time sub-periods comprising a subset of the available timeslots, the key generation module to generate a second identifier key for each of the plurality of time sub-periods.

20. The system of claim 14, wherein the timeslot data is expressed in a first time zone, and the timeslot data access module is to convert the timeslot data from the first time zone to a second time zone prior to generating the graphical display data.

21. The method of claim 1, wherein the generating of the identifier keys generates the identifier keys based on month and day portions of a date of the timeslot concatenated with a starting or ending time of the timeslot, and wherein the generating of the identifier keys is not based on a year portion of the date of the timeslot.

22. The method of claim 1, wherein the transmitting of the identifier keys and the graphical display data does not include transmitting other timeslot data.

23. The method of claim 1, wherein the generating of the set of identifier keys includes hashing a date and time associated with each timeslot of the set of available timeslots to generate the corresponding identifier key.

* * * * *